Nov. 15, 1949         C. E. ADAMS         2,488,109
CONTROL VALVE MECHANISM FOR FLUID MOTORS
Filed May 14, 1946                3 Sheets-Sheet 2

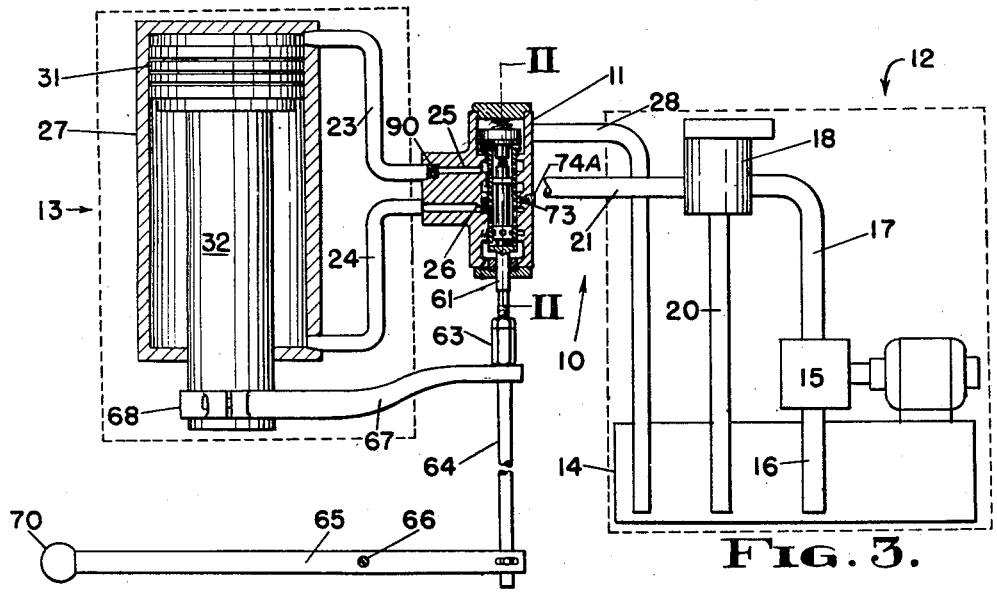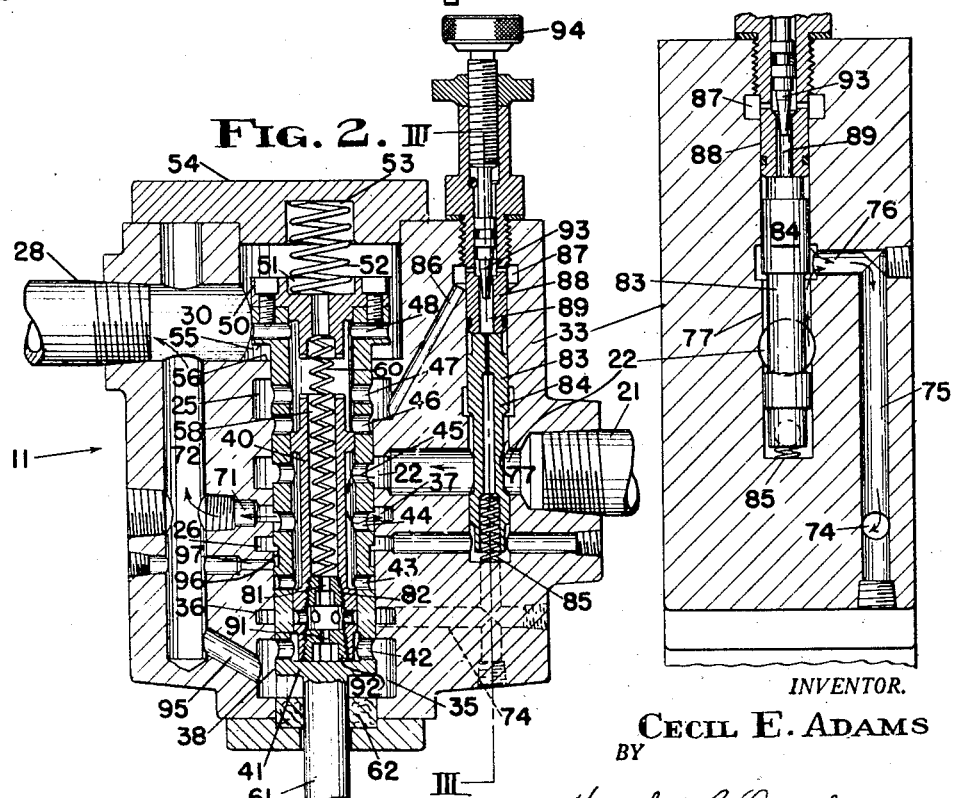

INVENTOR.
CECIL E. ADAMS
BY
Herschel C. Omohundro
Attorney

Nov. 15, 1949     C. E. ADAMS     2,488,109
CONTROL VALVE MECHANISM FOR FLUID MOTORS
Filed May 14, 1946     3 Sheets-Sheet 3

INVENTOR.
CECIL E. ADAMS
BY
Herschel C. Omohundro
Attorney

Patented Nov. 15, 1949

2,488,109

UNITED STATES PATENT OFFICE 2,488,109

CONTROL VALVE MECHANISM FOR FLUID MOTORS

Cecil E. Adams, Columbus, Ohio, assignor to The Denison Engineering Company, Columbus, Ohio, a corporation of Ohio Application May 14, 1946, Serial No. 669,657

18 Claims. (Cl. 60—52)

This invention relates generally to hydraulic apparatus and is particularly directed to valve mechanism for controlling the flow of fluid from a pressure source to a reversible hydraulic motor to cause the operation of said motor in a particular manner. The valve is especially useful in the control of a machine element such as, for example, the ram of a press. While the valve is also useful in other capacities, it is described in the present application as a control for a hydraulically operated ram.

One of the objects of the present invention is to provide a valve mechanism which may be manually controlled to govern the flow of hydraulic pressure to a reversible fluid motor to cause the simple reciprocation of a machine element throughout the full length of stroke for which the element has been designed.

Another object of the present invention is to provide a valve mechanism which may be manually operated to cause a machine element to perform a single advancing stroke followed by a period in which the element exerts a holding or pressing force at full capacity which period may be terminated at will by the machine operator.

Another object of the invention is to provide a valve mechanism which may be manually operated to cause a machine element, such as a press ram, to perform an advancing stroke, execute a series of short reciprocations or intermittent pressing impulses, which may be continued for any period of time determined by the operator, this series of impulses being followed by the return of the element to a starting position.

A further object of the invention is to provide a valve mechanism which may be manually controlled to cause a machine element to operate in any of the manners set forth in the preceding paragraphs and which may be manipulated when desired to arrest and retain the elements in any position or stage of operation.

A still further object of the invention is to provide a valve mechanism which may be actuated to cause the machine element to return to initial or starting position at any time and from any stage of operation at the will of the operator.

A further object of the invention is to provide a valve mechanism which is similar in function to an open center four-way valve and has means associated therewith for repeatedly adjusting the valve to automatically cause a fluid motor controlled thereby to alternate its direction of operation as many times as desired, the mechanism also having means for regulating the distance of operation of the motor in each direction.

Another object of the invention is to provide a valve mechanism having elements which coact to direct fluid flow through the mechanism to effect the operation of a fluid motor in a particular manner, one of the elements being manually controlled and another being at least partially operated by fluid pressure, other elements also being provided in the mechanism to regulate the application of the fluid pressure to the element operated thereby. With such a valve mechanism, a machine element, such as the ram of a hydraulic press, may be caused to operate in any or all of the manners set forth in the paragraphs above.

This application is a continuation-in-part of my copending application Serial No. 594,963, filed May 21, 1945.

Further objects and advantages of the present invention will be apparent from the following description, reference being had to the accompanying drawings wherein a preferred embodiment of the invention is clearly shown.

In the drawings:

Fig. 1 is a diagrammatic view of a hydraulic circuit in which a valve formed in accordance with the present invention has been incorporated;

Fig. 2 is a detail vertical transverse sectional view taken on the plane indicated by the line II—II of Fig. 1;

Fig. 3 is a detail vertical transverse sectional view taken on the plane indicated by the line III—III of Fig. 2;

Figure 4:
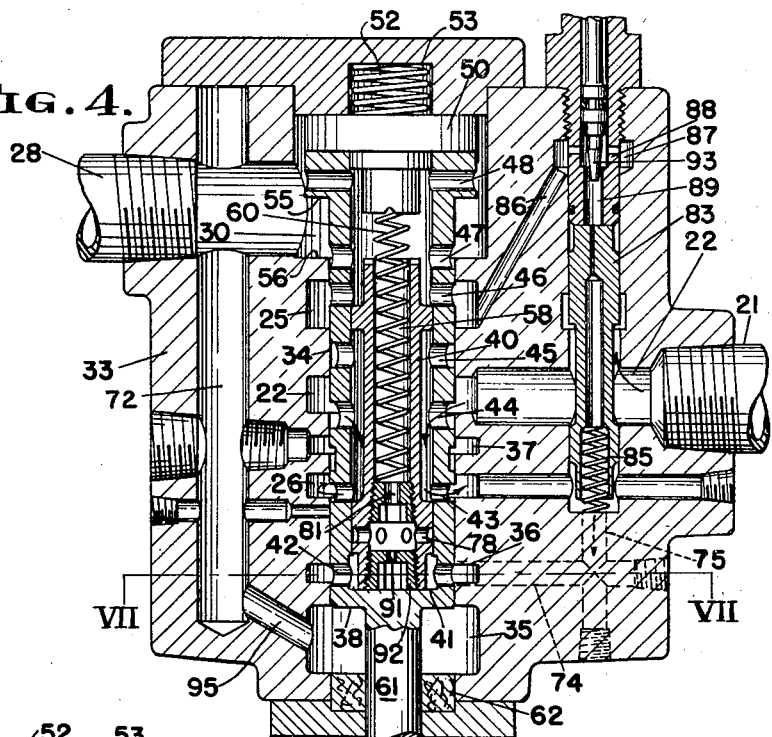
Fig. 4 is a view similar to Fig. 2 showing parts of the valve in a different relation.

Particular reference to Fig. 1 of the drawings will show that the fluid system 10 in which the valve 11, formed in accordance with the present invention, is disposed includes a pressure source designated generally by the numeral 12, a reversible fluid motor 13 which, in the present illustration, comprises a cylinder and piston slidably mounted therein and flow conduits which serve to connect the fluid pressure source and the motor 13 to the control valve mechanism 11. Any suitable source of fluid pressure may be employed, the one illustrated including the fluid reservoir 14, a motor driven pump 15 having an inlet pipe 16 extending from the reservoir to the pump, and an outlet pipe 17 leading from the pump to a pressure relief valve 18. This valve may be of conventional construction and includes a return pipe 20 through which fluid may be by-passed by the relief valve 18 directly back to the reservoir 14 when a predetermined pressure is exceeded in line 17. A fluid line 21 leads from the relief valve 18 to the inlet port 22 of the valve mechanism 11 and a pair of conduits 23 and 24 extend from cylinder ports 25 and 26 of this mechanism to the upper and lower ends, respectively, of the cylinder 27 which forms a part of the reversible fluid motor 13. A tank line 28 leads from the outlet port 30 of the valve mechanism to the reservoir 14. The valve mechanism 11 functions to control the flow of fluid pressure from the source 12 to and from the motor 13 to effect the reciprocation of the piston 31 in the cylinder 27. A ram 32 projecting from the piston 31 serves to utilize the motion of the piston in performing useful work.

From Figs. 2 to 7, inclusive, it will be observed that the valve mechanism 11 comprises a body 33 in which the ports 22, 25, 26 and 30 are formed. These ports terminate at their inner ends in annular grooves spaced longitudinally of a vertical bore 34. For convenience, the annular grooves bear the same reference numbers as the ports connected therewith. Additional annular grooves 35, 36, and 37 are also formed in the body around the bore 34 for purposes which will be set forth hereafter.

Fluid flow between the various ports in the body 33 is controlled by a pair of relatively movable valve elements 38 and 40. In the embodiment of the invention illustrated in the drawings, the element 38 takes the form of a sleeve having an integral bottom wall 41 and longitudinally spaced rows of laterally extending ports 42 to 48, inclusive. The upper end of the sleeve 38 is closed by a plug 50 in which a central recess 51 is formed for the reception of a coil spring 52, the upper end of this spring being received in a socket 53 formed in a cap member 54 which is attached to the body 33 to close the open upper end of the bore 34. The spring 52 normally tends to urge the sleeve 38 downwardly until a shoulder 55 provided thereon adjacent the upper end contacts a complemental shoulder 56 formed in the body 33.

In the present embodiment of the invention, the valve element 40 is disposed for longitudinal sliding movement in the sleeve 38, the element 40 having a reduced section which serves in the various positions of sliding movement of the element 40, to connect certain sets of ports in the sleeve 38. The member 40 has a longitudinally extending socket 58 formed therein for the reception of a coil spring 60 employed to normally urge the member 40 to the position shown in Figs. 2, 4, and 6 at the lower end of the sleeve 38, spring 60 abutting the plug 50 positioned in the upper end of the sleeve 38. A stem 61 projects from the lower end of the sleeve 38 through a packing gland 62 provided at the lower portion of the body 33 and this stem is connected by a coupling 63 to the upper end of a shipper rod 64 employed to control the operation of the valve and in turn the movement of the ram 32. Movement is imparted to the sleeve 38 through the shipper rod 64 by the actuation of a control lever 65 which is pivoted to a suitable support as at 66. An arm 67 is rigidly attached to the ram, as at 68, and projects around the shipper rod 64, this arm serving to engage the coupling 63 or a suitable collar, not shown, on the shipper rod to transmit motion from the ram to the valve element. When the knob 70 on the outer end of the lever 65 is moved up or down, movement in the opposite direction will be transmitted by the shipper rod 64 to the sleeve 38 and the valve element 40 contained therein. When the ram 32 is at its elevated or initial starting position, the fluid flow directing elements, 38 and 40, will be disposed in the relation shown in Fig. 2 of the drawings. At this time the press, or other machine of which the ram 32 forms a part, will be at rest. When the flow directing elements 38 and 40 are so disposed, as shown in Fig. 2, fluid from the pump 15 may flow through the lines 17 and 21 to the inlet port and groove 22, through the port 45 to the interior of the sleeve 38 from which it will flow outwardly through the ports 44 to the groove 37 which is connected by horizontal and vertical passages 71 and 72 with the outlet port 30, fluid being exhausted through tank line 28 to the reservoir 14. By by-passing the fluid in this manner, the pump 15 may be operated without load when the fluid motor 13 is idle.

As illustrated in Figs. 2, 4, 5, and 6 the passage 71 is provided with screw threads for the reception of a plug, not shown, which may be used to block the passage 71 when it is desired to use the exhaust flow during idle periods of the motor 13 for the operation of some other mechanism. When passage 71 is thus blocked, a second passage 73 formed in the body 33 in communication with groove 37 and generally closed by a plug 74A may be connected with the additional mechanism to be operated. The fluid will then flow from the power source through the passages enumerated above and out of the valve casing or body 33 to the conduits leading to the additional device.

Figure 5:
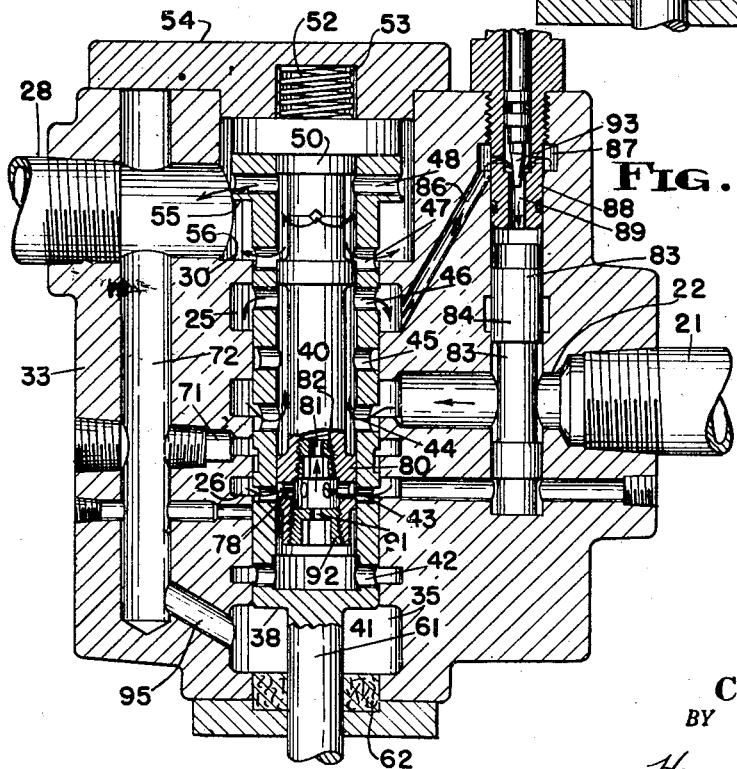
Fig. 5 is a similar view showing parts of the valve in a still different relation.
Figure 7:
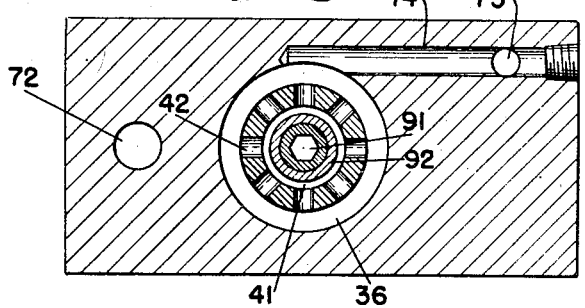
Fig. 7 is a detail horizontal sectional view taken on the plane indicated by the line VII—VII of Fig. 4.

Fluid under pressure from the source 12 may be directed to the upper end of the cylinder 27 to cause the ram 32 to advance or move downwardly by depressing the knob 70 on the lever 65. This motion moves the sleeve from the position shown in Fig. 2 designated in some of the claims as an intermediate position, to a first extreme position shown in Fig. 4 in which port 42 formed in the sleeve 38 will register with annular recess 36 in the body 33. As shown in Figs. 2, 3, and 7, recess 36 is connected by passages 74, 75, 76, and 77 with the inlet port 22 whereby fluid under pressure may flow from the inlet port 22 to the annular chamber 36 and through the ports 42 to the interior of the sleeve 38 beneath the valve element 40. This fluid under pressure will move the element 40 against the opposition offered by the spring 60 to an upper position as illustrated in Fig. 5. When element 40 is so disposed, fluid under pressure may flow from the inlet 22 through ports 44 to the interior of the sleeve and upwardly therein to the ports 46 through which it will flow to the annular chamber 25. This chamber is connected with the cylinder port 25 and fluid introduced thereto will flow through conduit 23 to the upper end of cylinder 27.

It will also be observed that when the element 40 is in the raised position, ports 78 formed in the lower head 80 thereof will register with ports 43 in the sleeve which ports register at this time with the cylinder port and groove 26, this port and groove being connected by the conduit 24 with the lower end of the cylinder 27. The pressure on the fluid introduced to the upper end of the cylinder may therefore force the piston downwardly, causing the fluid beneath the same to be exhausted through the line 24 to the port and groove 26 through the ports 43 and 78 into the interior of the element 40 which has been counterbored in registration with the port 78. This exhaust fluid may flow from the counterbore in the member 40, through a reduced opening 81 in a plug 82 threadedly received by the member 40, and through the hollow interior of this member to the upper end of the sleeve where it may be exhausted through a drill in cap 50 or through the ports 48 to the exhaust ports 30. From the description thus far, it will be apparent that when the control 70 is moved downwardly, fluid under pressure will be caused to actuate the valve element 40 to place the elements 38 and 40 in such a relation that fluid from the power source may flow to the upper end of the power unit or motor 13, exhaust fluid may flow from the lower end thereof to the reservoir 14, and the power unit may then operate in what may be termed a forward direction.

To secure certain operating characteristics, the flow of fluid under pressure from the inlet port 22 to the annular groove 36 is interrupted, after the member 40 has been elevated, through the operation of a spool valve 83 arranged for sliding movement in the passage 77. This spool 83 has a head 84 which serves, when the spool valve is moved downwardly, to block the passage 77 so that fluid may not flow from the port 22 through the passage 77 to the passage 76. Valve 83 is normally urged toward an open position by a coil spring 85 disposed between the bottom of the passage 77 and the lower end of the valve. To close the valve 83, fluid under pressure is supplied to the upper end thereof through a passage 86 which leads from the annular groove 25 to a chamber 87 formed at the upper end of the passage 77, through ports formed in a needle valve casing 88 and a longitudinal passage 89 also formed in this needle valve casing. The cylinder port 25 receives a restriction 90 which serves to insure sufficient pressure for the operation of spool valve 83, even though the motor 13 is operating without load.

It will thus be seen that as soon as fluid under pressure is supplied to the motor 13, the flow of fluid from the pressure source to the under side of the valve element 40 will be interrupted. This valve element 40 will be retained in an elevated position, however, by the fluid being exhausted from the lower end of the fluid motor. This exhaust flow is obstructed slightly by the reduced size of the opening 81 so that a back pressure exists in the counterbored portion of the member 40, which pressure will be transmitted through an opening 91 formed in a second plug 92 threadedly disposed in the lower end of the element 40, to the interior of the shuttle beneath the element 40. Since all passages leading from this region are blocked, the pressure will react to hold the element 40 in its elevated position. This position will be maintained as long as fluid is being exhausted from the lower end of the fluid motor.

When the piston 31 stops in its movement toward the lower end of the cylinder 27 for any reason, the back pressure in the counterbored portion of the element 40 will be dissipated through the opening 81, and the pressure in the sleeve below the element 40 will be dissipated through the opening 91. Spring 60 may then expand to move the element 40 to the lowermost position shown in Figs. 2, 4, and 6. When this movement of the shuttle valve element 40 occurs with the sleeve 38 held in its elevated position as shown in Fig. 4, the upper end of the fluid motor will be connected with the fluid reservoir 14 and the lower end of the motor will be connected with the fluid pressure source. Fluid under pressure will therefore immediately start to flow to the lower end of the power unit to move the piston and ram upwardly or in a reverse direction. The fluid pressure, flowing into the valve mechanism 11 through the line 21, will flow from the inlet groove 22, through ports 44, the interior of the sleeve 38, through ports 43 to groove 26, which groove is connected by line 24 with the lower end of the cylinder 27. Fluid pressure will then act upon the lower surface of the piston 31 to move the same in an upward direction. Fluid exhausted from the upper end of the cylinder 27 will flow through line 23, port and groove 25, ports 46, sleeve 38 and ports 47 to the outlet port 30 which is connected by the line 28 with the reservoir 14. Inasmuch as groove 25 is connected with the reservoir, fluid under pressure in passage 77 above valve 83 will be dissipated through passages 89, 88, 87, and 86 and spring 85 at the lower end of spool 83 may then expand to force the spool valve upwardly until it is stopped through engagement with the lower end of the needle valve casing. At this time, fluid may flow from the inlet port 22 through the passage 77 to passage 76 from which it will flow through passages 75 and 74 to the groove 36 and from this groove through ports 42 to the interior of the sleeve 38 beneath the valve element 40. This fluid pressure will again move the valve element 40 upwardly in opposition to the spring 60 to the position shown in Fig. 5 wherein fluid under pressure will again be directed to the upper end of the fluid motor cylinder 27. This fluid will cause the piston to reverse its direction of travel and move forwardly or downwardly in a pressing stroke.

The length of time the valve element remains in its lowered position shown in Fig. 4 and consequently the distance moved upwardly by the ram 32 and piston 31 is determined by the setting of the needle valve 93 in the housing therefor. If the needle valve is only slightly open, fluid pressure above spool valve 83 will be slowly dissipated and movement of this spool valve to an open position will be retarded. Fluid flow from the pressure source to the underside of the piston 31 will thus be prolonged and the piston and ram 32 will move a greater distance than if the needle valve is fully opened and the spool valve 83 moved quickly to an open position.

It should be apparent from the above description that as soon as the valve 40 is elevated, fluid under pressure will again be applied to the upper end of the spool 83 to close this valve to cut the flow of fluid from the inlet port to the groove 36 and the underside of the valve 40. Of course, even though this flow is discontinued, the exhaust flow from the lower end of the cylinder 27 will retain the valve element in an elevated position, and the motor 13 will continue to move in a forward direction until stopped by the engagement of the piston 31 with the lower end of the cylinder 27 or the engagement of the ram 32 with an obstruction which offers more resistance than the force developed by fluid pressure in the upper end of the cylinder 27 at the setting of the relief valve 18, this valve operating to spill fluid to the reservoir 14 when a predetermined pressure per square inch has been applied to the fluid in the pressure line. When the piston 31 and ram 32 stop moving in a forward direction, the back pressure in the counterbored portion of the element 40 will be dissipated as previously described, and the element 40 will again move to its lower position in the sleeve 38. As long as the control lever 65 is held in a depressed condition and the sleeve 38 in an elevated position as a result thereof, the ram 32 and piston 31 will reciprocate as above described through a portion of the full stroke thereof.

The distance traversed by the piston and ram during these reciprocations is determined by the setting of the needle valve 93 which may be adjusted through the manipulation of a control knob 94 carried by the upper end of the needle valve and disposed exteriorly of the body 33.

Figure 6:
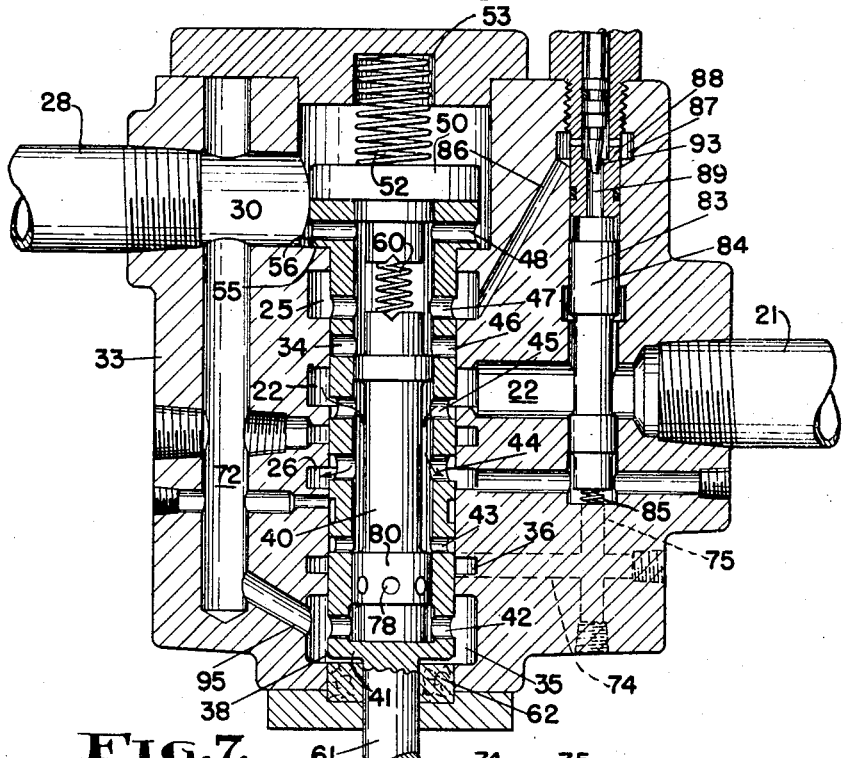
Fig. 6 is also a vertical longitudinal sectional view taken through the valve showing the parts in another relation.

When it is desired to discontinue the reciprocations of the piston and ram and return the same to initial starting position, the knob 70 may be released to permit spring 52 to move the sleeve 38 to its lowermost position as illustrated in Fig. 6. At this time ports 42 in the sleeve 38 will register with annular groove 35 which is connected by an angular lateral passage 95 with the lower end of vertical passage 72, the latter being connected at its upper end with the outlet port 30. The fluid pressure in the sleeve 38 beneath the valve element 40 will thus be instantly dissipated, permitting the element 40 to move to its lowermost position wherein fluid introduced from the fluid pressure source through the inlet port 22 will flow through the port 45 to the interior of the sleeve and outwardly therefrom through ports 44 to the cylinder groove 26, from which it will flow by way of line 24 to the lower end of the cylinder 27. When the valve elements 38 and 40 are thus positioned, the upper end of the cylinder 27 will be connected with the reservoir by line 23, cylinder port and groove 25, ports 47, the interior of the sleeve 38, ports 48, outlet port 30, and tank line 28. Fluid pressure under the piston 31 will therefore move the piston upwardly until the arm 67 connected with ram 32 engages coupling 63, or a collar secured to the shipper rod 64, and moves the sleeve 38 to the position shown in Fig. 2 in which position fluid under pressure from the pressure source will be by-passed directly to the reservoir 14 at which time the ram will come to rest.

When the sleeve is positioned as shown in Fig. 2, an annular groove 96 in the exterior thereof connects the groove 26 and a lateral passage 97 in the body so that fluid under pressure seeping into passage 26 will be returned to the reservoir via passage 72 and thus be prevented from flowing to the lower end of the cylinder 27 to move piston 31. It should be obvious that the ram and piston may be returned to starting position from any stage of movement merely by moving the control lever 65 to an upper position. This movement will take place automatically if the knob 70 is released.

With the valve mechanism described, it is possible to secure a ram operation known in the trade as "inching." This operation is a gradual downward movement of the ram in a working stroke. To secure this gradual movement the lever 65 is depressed through the actuation of the knob 70 until the sleeve 38 has been elevated sufficiently to cause the registration of the ports 42 with the groove 36. At this time, as previously described, fluid under pressure will flow from the inlet port 22 through passages 77, 76, 75 and 74 to the groove 36 and through the openings 42 into the sleeve 38 beneath the valve element 40. This fluid under pressure will move the valve element to its upper position shown in Fig. 5 wherein fluid under pressure is supplied from the inlet port 22 and the groove 22, through sleeve ports 44, through the interior of the sleeve, and thence through ports 46 to cylinder groove and port 25 from which this fluid will flow through conduit 23 to the upper end of the power cylinder 27. When the sleeve is elevated in this manner, the lower end of the power cylinder is connected with the fluid reservoir 14 as previously described through the registration of port 43 with the groove 26. By limiting the upward movement of the sleeve 38 so that ports 43 do not fully register with groove 26, the quantity of fluid permitted to be exhausted from the lower end of cylinder 27 may be controlled. In this manner the speed of movement of ram 32 and piston 31 may also be controlled.

To cause the ram 32 to remain in a lowered position and exert holding pressure on an article while the knob 70 is held depressed, the needle valve 93 may be screwed down to a completely closed position in which fluid under pressure will be prevented from flowing through lines 86, 87, 88 and 89 to the upper end of valve spool 83. This valve spool will then remain in an open position permitting fluid to flow through passages 77, 76, 75 and 74 to the groove 36 from which it will flow through ports 42 to the underside of the valve element 40. This element will thus be held in an upper position shown in Fig. 5 in which fluid under pressure will be continuously supplied to the upper end of the power cylinder 27. When the needle valve is in this position of adjustment, the knob 70 must be raised to permit the ram to return to its initial starting position.

While the form of embodiment of the present invention as herein disclosed constitutes a preferred form, it is to be understood that other forms might be adopted, all coming within the scope of the claims which follow.

I claim:

1. In a hydraulic system, a fluid pressure source, a reversible fluid motor, an open center four-way valve mechanism for controlling the flow of fluid from said source to said motor to govern the operation thereof, said four-way valve being movable between two extreme positions through an intermediate position, said valve directing fluid from said source to said motor to cause reverse operation thereof when in one extreme position and both forward and reverse operation thereof when in the other extreme position, the fluid from said source being directed to exhaust when said valve is in intermediate position; and means operating in conjunction with said valve when the same is in the extreme position providing both forward and reverse operation to vary the distance of forward and reverse operation of said motor.

2. In a hydraulic system, a source of fluid pressure; a reversible fluid motor; means for controlling the operation of said motor comprising a casing having primary and secondary flow-directing elements, said primary element being movable relative to said casing between two extreme positions through an intermediate position, said secondary element being movable between first and second positions relative to said primary element; means for moving said primary element from said intermediate to one of said extreme positions; means responsive to fluid pressure when said primary element is in said one extreme position to apply fluid pressure to said secondary element to move the same from the first to the second position, said fluid pressure responsive means being inoperative when said secondary element is in said second position; means for returning said secondary element from said second to said first position; and means for moving said primary element from one extreme position to the other.

3. In a hydraulic system, a source of fluid pressure; a reversible fluid motor; means for controlling the flow of fluid pressure from said source to said motor to effect the operation thereof comprising a casing having primary and secondary flow-directing elements, said primary element being movable between first and second extreme positions through an intermediate position relative to said casing, said secondary element being movable between first and second positions relative to said primary element; said motor operating in a forward direction when said primary element is in the first extreme position and said secondary element is in its first position and in a reverse direction when said secondary element is in its second position while said primary element is in the first extreme position; and means responsive to fluid pressure when said secondary element is in the first position to apply fluid from said source to said secondary element to move the same to said second position.

4. In a hydraulic system, a source of fluid pressure; a reversible fluid motor; means for controlling the flow of fluid pressure from said source to said motor to cause forward and reverse operation thereof, said means having a manually movable member a pressure responsive shuttle valve; and, means responsive to fluid pressure when said manually movable member is in one position to apply fluid pressure from said source to said shuttle valve to move the same to a position to direct fluid from said source to said motor to operate the same in one direction; and, means operative when the operation of said motor in said one direction ceases to move said shuttle valve to a second position to operate said motor in the opposite direction while said manually movable member is maintained in said one position.

5. In a hydraulic system, a source of fluid pressure; a reversible fluid motor, a four-way valve mechanism for controlling the flow of fluid pressure from said source to said motor to effect the operation thereof, said valve mechanism having a valve element movable between two extreme positions through an intermediate position; fluid flow control means having a fluid connection and cooperating with said valve element to cause alternate forward and reverse operation of said motor, said means being continuously operative when said valve element is held in one extreme position; and means for regulating the length of operating periods of said motor in either direction, movement of said valve element to said intermediate position serving to arrest said motor at any selected stage of operation.

6. In a hydraulic system, a source of fluid pressure; a reversible fluid motor, a four-way valve mechanism for controlling the flow of fluid pressure from said source to said motor to effect the operation thereof, said valve mechanism having a valve element movable between two extreme positions through an intermediate position; fluid flow control means having a fluid connection and cooperating with said valve element, said means being actuated in part by fluid pressure to cause alternate forward and reverse operation of said motor and being operative as long as said valve element is maintained in one extreme position; and means for regulating said fluid pressure actuated means to vary the rate of response thereof, movement of said valve element away from said extreme position serving to render said fluid pressure actuated means inoperative.

7. In a hydraulic system, a source of fluid pressure; a reversible fluid motor; flow control means for governing the operation of said motor comprising a body provided with inlet, outlet and cylinder ports; valve means disposed for movement in said body to connect certain ports, said valve means having sleeve and spool members movable relative to one another; means in said body for directing fluid from said pressure source to said members to move the same from one relative position to another, the flow of fluid pressure to said members being interrupted in the second relative position of said members; means in said body for governing the operation of said fluid directing means; and means for selectively moving one of said members to render said fluid directing means ineffective.

8. In a hydraulic system, a source of fluid pressure, a reversible fluid motor; flow control means for governing the operation of said motor comprising a body provided with inlet, outlet and cylinder ports; valve means disposed for movement in said body to connect certain ports, said valve means having a sleeve member movable between two extreme positions in said body; a spool member movable between two positions relative to said sleeve member; means operative when said sleeve member is disposed approximately in one extreme position to direct fluid from said pressure source to said valve means to cause said sleeve and spool members to be disposed in certain positions relative to one another, said last-named fluid-directing means being rendered inoperative by the placing of said members in said certain positions; means for returning said members to the positions they occupied before the application of fluid pressure thereto, and means for selectively actuating said valve means to render said valve-returning means operative.

9. In a hydraulic system, a source of fluid pressure; a power unit having a cylinder and piston disposed for reciprocation therein; means for controlling the flow of fluid pressure from said source to said power unit to effect the movement of said piston comprising a casing having inlet and exhaust ports; a sleeve element in said casing; a spool member disposed for movement in said sleeve element, said sleeve and spool being movable relative to said casing; means connected with said sleeve element for moving the same to selected positions; and means in said casing operated in part by fluid pressure when said sleeve member is in a selected position to change the relation between said sleeve and spool to cause repeated reciprocation of said piston, movement of said sleeve to another selected position serving to render said last-named means ineffective and cause the return of said piston to initial position.

10. In a hydraulic system, a source of fluid pressure; a power unit having a cylinder and piston disposed for reciprocation therein; means for controlling the flow of fluid pressure from said source to said power unit to effect the movement of said piston comprising a casing having inlet and exhaust ports; a sleeve element in said casing; a spool member disposed for movement in said sleeve element, said sleeve and spool being movable relative to said casing; means connected with said sleeve element for moving the same to selected positions; fluid flow control means in said casing operated in part by fluid pressure when said sleeve member is in a selected position to change the relation between said sleeve and spool members to cause repeated reciprocation of said piston, movement of said sleeve to another selected position serving to render said last-named means ineffective and cause the movement of said piston toward initial position; and means operated by said piston for moving said sleeve member to a position between said selected positions to connect said pressure source with said exhaust when said piston reaches its initial position.

11. In a hydraulic system, a source of fluid pressure; a power unit having a cylinder and piston disposed for reciprocation therein; means for controlling the flow of fluid pressure from said source to said power unit to effect the movement of said piston comprising a casing having an inlet port connected with said pressure source, cylinder ports connected with opposite ends of said cylinder and an exhaust port; a multiple part flow directing means movably disposed in said casing to connect either cylinder port with said inlet port and the other cylinder port with said exhaust port; control means for moving said flow-directing means and maintaining a part thereof in selected positions; and means in said casing operating automatically, when the first mentioned part of said flow-directing means is held in a selected position, to shift another part of said flow-directing means to alternately connect said inlet and exhaust ports with each of said cylinder ports.

12. In a hydraulic system, a source of fluid pressure; a power unit having a cylinder and piston disposed for reciprocation therein; means for controlling the flow of fluid pressure from said source to said power unit to effect the movement of said piston comprising a casing having an inlet port connected with said pressure source, cylinder ports connected with opposite ends of said cylinder and an exhaust port; flow-directing means movably disposed in said casing and operative to connect either cylinder port with said inlet port and the other cylinder port with said exhaust and to connect the inlet and exhaust ports; control means for moving said flow-directing means and maintaining a part thereof in selected positions; means in said casing operating automatically when the first mentioned part of said flow-directing means is held in a selected position, to adjust another part of said flow-directing means to alternately connect said inlet and exhaust ports with each of said cylinder ports, said automatically operating means being rendered ineffective when the first mentioned part of said flow-directing means is moved by said control means to another selected position whereby the inlet port will be connected with a predetermined cylinder port; and means responsive to movement of said piston for moving said flow-directing means to a position to connect said inlet and exhaust ports.

13. In a hydraulic system, a fluid pressure source, a reversible fluid motor, an open center four-way valve mechanism for controlling the flow of fluid from said source to said motor to govern the operation thereof, said four-way valve being movable between two extreme positions through an intermediate position, said valve directing fluid from said source to said motor to cause reverse operation thereof when in one extreme position and both forward and reverse operation thereof when in the other extreme position, the fluid from said source being directed to exhaust when said valve is in intermediate position; means operating in conjunction with said valve when the same is in the extreme position providing both forward and reverse operation to vary the distance of forward and reverse operation of said motor; and additional means also operating in conjunction with said valve for rendering said first-mentioned means inoperative.

14. A control valve mechanism for fluid motors comprising a casing having an internal chamber and, inlet, motor and exhaust ports communicating therewith; valve means disposed in said chamber for movement to various positions to establish communication between certain of said ports; passage means in said casing operating in one position of said valve means to apply fluid at inlet port pressure to said valve means to move the same to another position; and additional valve means in said passage means, said additional valve means being responsive to fluid pressure when said first-mentioned valve means has been moved by fluid pressure to the latter position to interrupt the application of fluid pressure to said first-mentioned valve means.

15. A control valve mechanism for fluid motors comprising a casing having an internal chamber and, inlet, motor and exhaust ports communicating therewith; valve means disposed in said chamber for movement to various positions to establish communication between certain of said ports; passage means in said casing operative in one position of said valve means to apply fluid at inlet port pressure to said valve means to move the same to another position; additional valve means in said passage means, said additional valve means being responsive to fluid pressure when said first-mentioned valve means has been moved by fluid pressure to the latter position to interrupt the application of fluid pressure to said first-mentioned valve means and, means for varying the rate of response of said additional valve means to said fluid pressure.

16. A control valve mechanism for fluid motors comprising a casing provided with an internal chamber and inlet, motor and exhaust ports communicating therewith; valve elements disposed in said chamber for movement relative to said casing, said valve elements also being movable relative to one another to control communication between said ports; means for moving said valve elements back and forth in said chamber; yieldable means for moving one of said valve elements relative to another in one direction; passage means in said casing operative in one position of said valve elements relative to said casing to apply fluid at inlet port pressure to said valve elements to move the said one element in opposition to said yieldable means; and a valve element in said passage, said valve element being operated by fluid pressure when said one element has been moved in opposition to said yieldable means to interrupt the application of fluid pressure to said valve elements through said passage means.

17. A control valve mechanism for fluid motors comprising a casing having an internal chamber and inlet, motor and exhaust ports communicating therewith; valve means disposed for movement in said chamber, said valve means having a ported sleeve and a spool disposed for movement in said sleeve to connect certain sets of ports therein, the ports in said sleeve communicating with certain ports in said casing in one position and other ports in another position; yieldable means normally urging said sleeve and spool toward certain positions; means for moving said sleeve in opposition to said yieldable means; passage means in said casing operative when said sleeve is in a certain position to connect the inlet port in said casing with the interior of said sleeve at one end of said spool to apply fluid at inlet port pressure to the spool to move the same in opposition to said yieldable means; and a second valve means in said passage, said second valve means being responsive to fluid pressure when said spool is moved in opposition to said yieldable means to interrupt fluid flow through said passage means.

18. A control valve mechanism for fluid motors comprising a casing having an internal chamber and inlet, motor and exhaust ports communicating therewith; valve means disposed for movement in said chamber, said valve means having a ported sleeve and a spool disposed for movement in said sleeve to connect certain sets of ports therein, the ports in said sleeve communicating with certain ports in said casing in one position and other ports in another position; yieldable means normally urging said sleeve and spool toward certain positions; means for moving said sleeve in opposition to said yieldable means; passage means in said casing operative when said sleeve is in a certain position to connect the inlet port in said casing with the interior of said sleeve at one end of said spool to apply fluid at inlet port pressure to the spool to move the same in opposition to said yieldable means; a second valve means in said passage, said second valve means being responsive to fluid pressure when said spool is moved in opposition to said yieldable means to interrupt fluid flow through said passage means; and adjustable means for regulating the rate of application of fluid pressure to said second valve means.

CECIL E. ADAMS.

REFERENCES CITED

The following references are of record in the file of this patent:

UNITED STATES PATENTS

| Number | Name | Date |
| --- | --- | --- |
| 1,931,452 | Wheeler | Oct. 17, 1933 |
| 2,212,871 | Wood | Aug. 27, 1940 |